Nov. 28, 1950     H. E. W. WEST     2,532,000
CAM OPERATED SWITCH CONTACT
Filed July 29, 1946     2 Sheets—Sheet 1
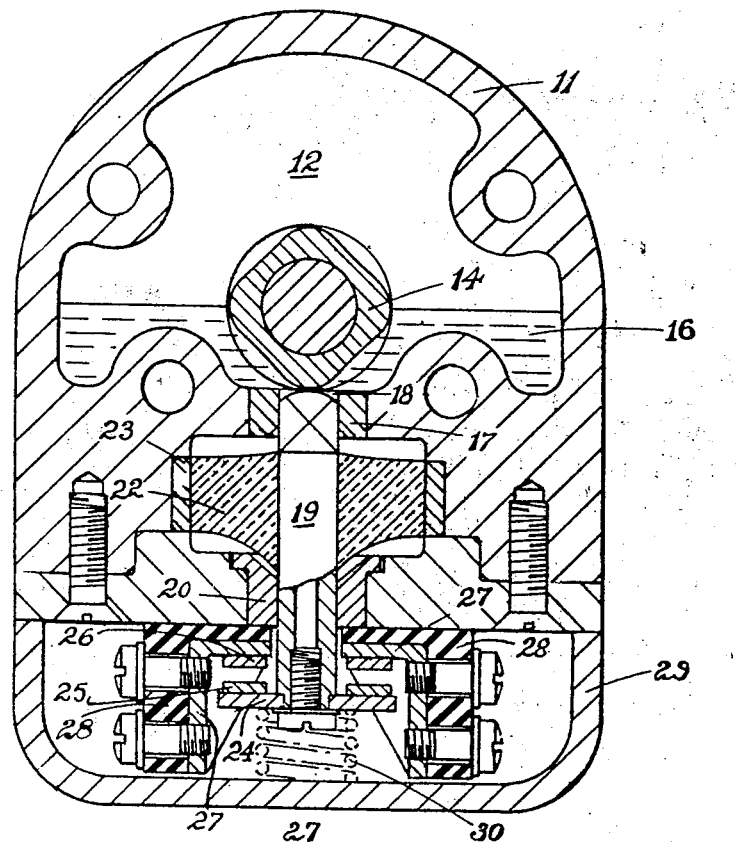
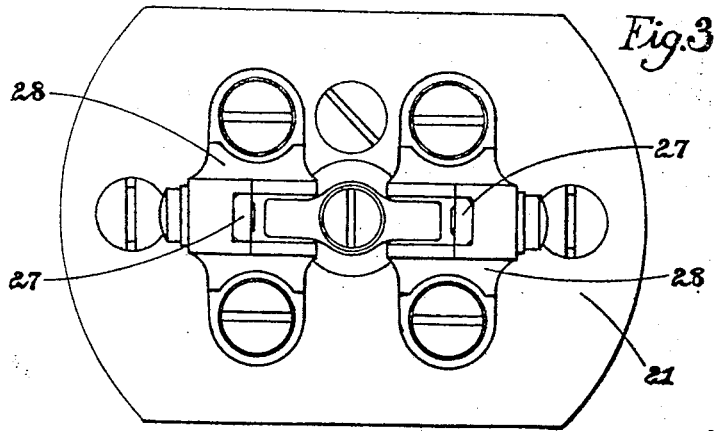
INVENTOR
HAROLD EDWARD WILLIAM WEST
BY
Wilkinson & Mawhinney
ATTORNEYS Nov. 28, 1950 — H. E. W. WEST — 2,532,000
CAM OPERATED SWITCH CONTACT
Filed July 29, 1946 — 2 Sheets-Sheet 2

INVENTOR
HAROLD EDWARD WILLIAM WEST
BY
Wilkinson & Mawhinney
ATTORNEYS

Patented Nov. 28, 1950

2,532,000

UNITED STATES PATENT OFFICE 2,532,000

CAM OPERATED SWITCH CONTACT

Harold Edward William West, Allestree, England, assignor to Rolls-Royce Limited, Derby, England, a British company Application July 29, 1946, Serial No. 687,018
In Great Britain May 24, 1944

Section 1, Public Law 690, August 8, 1946
Patent expires May 24, 1964

2 Claims. (Cl. 200—30)

This invention relates to magnetos and has for its object to provide an improved construction and arrangement of contact-breaker therefor. Considerable trouble and difficulty is experienced on magnetos used on aero-engines due to the injurious effects of oil on the low tension contacts. The usual type of contact-breaker which comprises a rocker arm with its heel resting on the operating cam involves the necessity for some form of lubrication of the heel and cam and there is always a risk of the lubricant reaching the contacts.

Another difficulty which also contributes to contact failure is that the contacts are liable to rebound after closing and in fact there may be a succession of rebounds which gradually die away. This action results in further injury to the contact surface due to the arcing which ensues.

This invention comprises a contact-breaker for a magneto, wherein the cam-operated member which carries the contact or contacts extends through and is sealed to an oil-tight non-metallic flexible diaphragm which isolates the cam-chamber from the contact-chamber.

According to another feature of this invention, the improved contact-breaker comprises a pin having a rubber or like flexible flange bonded to it between its ends, and means for securing the periphery of the flange to the casing, the pin being engaged at one end by the operating cam so as to be moved axially thereby, and carrying a contact-member at its other end.

Preferably, the flexible flange is made of rubber and is bonded to the pin, the rubber being of substantial thickness so that its resilience holds or assists in holding the pin in contact with the cam; the inherent damping qualities of the rubber also assist in preventing rebound.

The invention also includes certain novel details of construction as described with reference to a particular embodiment of the invention.

Referring now to the accompanying drawings:

Figures 1 and 2 show cross-sections at right-angles to each other through a magnetic casing which incorporates a contact-breaker embodying the invention;

Figure 3 shows a plan of the stationary contact carriers viewed from below in Figure 1 and with the contact-chamber cover removed;

Figure 2:
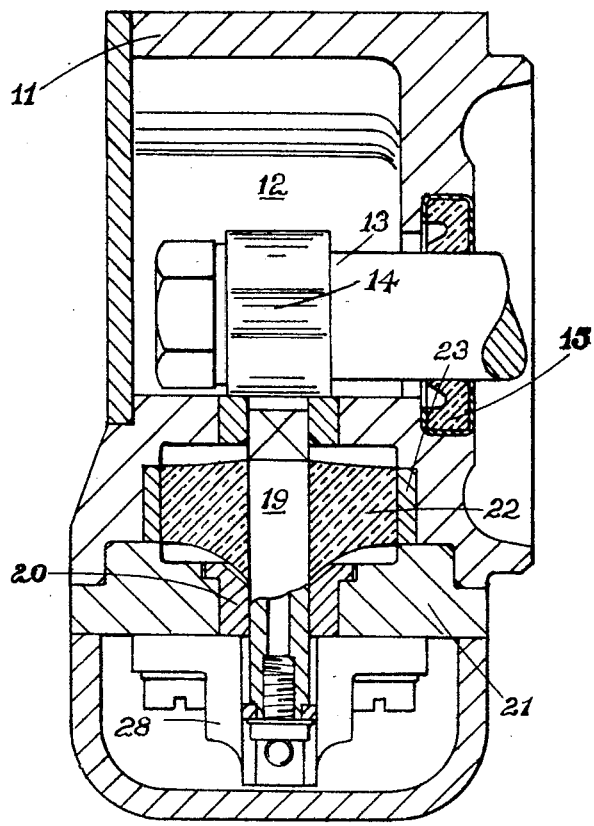
Figure 4:
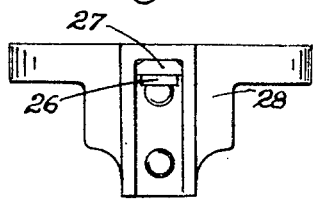
Figure 4 shows an end elevation of one of the contact carriers illustrated in Figure 3.

The magneto casing 11, Figures 1 and 2, is so shaped as to provide a chamber 12 in which the shaft 13 and operating cam 14 are located, and a suitable oil-seal 15 is provided around the shaft 13 to prevent the passage of oil from the chamber 12 to the armature (not shown). The cam-chamber 12 is closed and used as an oil bath 16 in order that effective lubrication of the cam 14 is ensured. In one wall of the cam-chamber 12 there is provided a bush 17 with a hole 18 through which extends a pin 19, the length of the pin being radial to the cam 14; the pin 19 is made of hardened steel and the end which engages the cam 14 to be operated thereby is preferably chromium-plated. This end of the pin 19 is preferably square and the hole in the bush 17 with which it engages is also square, and the bush is made of adequate length to take the lateral thrust arising from the operation of the cam 14; a bearing 20 may be provided in an aluminium block 21 forming the base of the casing 11. The bearing 20 is arranged near the other end of the pin 19 and is preferably of the type which is impregnated with lubricant and does not require a supply of liquid lubricant.

At a suitable distance from the ends of the pin 19 there is bonded to it a thick rubber flange 22 and the periphery of this flange is in turn bonded to a steel sleeve 23 which can be tightly held in the casing 11. The rubber flange 22 is situated outside the bush 17 through which the pin 19 projects to engage the cam 14, and although a certain amount of oil will leak along the length of the pin, it is effectively stopped by the rubber flange which constitutes an impermeable and flexible diaphragm separating the two ends of the pin.

The end of the pin 19 remote from the operating cam 14 carries a connector 24 having disposed thereon a contact or pair of contact-members 25 which are moved by the axial movement of the pin into and out of engagement with a co-operating stationary contact or contacts 26 to control the low tension circuit. The stationary contact or contacts 26 are mounted on a suitable insulated carrier 27 which is adjustable in a direction axial of the pin 19 in a bracket or slide 28 of insulating material to effect the timing of the make-and-break. These contacts are all situated outside the casing 11 of the magneto and provided with a removable cover 29 so that they are readily accessible.

The advantage of using a pair of movable and a pair of stationary contacts is that it renders the mechanism symmetrical and increases the reliability. The co-operating pair or pairs of contacts 25 and 26 may have parallel faces so that they abut directly against one another, but if desired, non-parallel contact faces can be used so as to obtain a "scrubbing" action which is commonly used to assist in keeping the contacts clean; alternatively or additionally one contact of each pair may be resiliently mounted, with the object of always securing definite engagement of the contacts with one another.

The principal advantage of the above-described construction is that the electrical and mechanical parts of the contact-breaker are hermetically sealed from one another and the mechanical parts, that is to say the cam 14 and the end of the pin 19 which is engaged by it can run continuously in the oil bath 16 without any risk of oil reaching the contacts. Another advantage is that the inherent damping capacity of the rubber flange 22 largely prevents vibration of the contacts 25 and 26 and the deleterious burning arising therefrom.

The elasticity of the rubber flange 22 may also be used in place of a spring to maintain the pin 19 in engagement with the cam 14, but if desired, an additional spring 30 indicated in chain lines in Figure 1 may be used. This is conveniently located in the contact-chamber so as to engage the pin 19 axially, the removable cover serving as an abutment for the spring 30.

I claim:

1. A cam-operated contact breaker for the ignition system of an internal combustion engine comprising in combination a casing; a shaft entering said casing and borne for rotation in said casing; a cam on said shaft; a push-rod engaged by said cam; bearing means in said casing to guide said push-rod along its longitudinal axis; a metal ring clamped in said casing in oil-tight manner; an annular rubber-like oil-impervious flexible diaphragm bonded to said push-rod in oil-tight manner at inner edge and bonded to said metal ring in oil-tight manner at outer edge, so as to form in said casing two chambers separated in oil-tight manner; one of said chambers accommodating said shaft and cam and constituting an oil bath therefor; electrical contacts in the second chamber, said contacts being operated by said cam through said push-rod; and removable cover means to said second chamber to provide access to said second chamber for assembly and adjustment of said electrical contacts.

2. A cam-operated contact-breaker for the ignition system of an internal combustion engine comprising in combination a magneto casing; a shaft entering said casing and borne for rotation in said casing; a cam on said shaft; a push-rod engaged by said cam to move said push-rod in the direction of its longitudinal axis; bearing means in said casing, one such means located near each end of said push-rod and operative to guide said push-rod in movement along its longitudinal axis; an annular rubber-like oil impervious flexible diaphragm bonded to said push-rod in oil tight manner at inner edge, being located in said casing between said bearing means in a plane at right angles to the longitudinal axis of said push-rod, and having an annular metal ring bonded to its outer edge; an annular recess in said casing to receive said metal ring so as to restrain said flexible diaphragm from movement in the axial direction of the push-rod except by deformation of the diaphragm material, and whereby there is formed in said casing two chambers separated in oil tight manner, one of said chambers accommodating said shaft and cam and constituting an oil-bath therefor; electrical contacts in the second chamber, said contacts being operated by said cam through said push-rod; and removable cover means to said second chamber to provide access to said chamber for assembly and adjustment of said electrical contacts.

HAROLD EDWARD WILLIAM WEST.

REFERENCES CITED

The following references are of record in the file of this patent:

UNITED STATES PATENTS

| Number | Name | Date |
|---|---|---|
| 1,313,856 | Cavanagh | Aug. 19, 1919 |
| 1,997,288 | Anderson | Apr. 9, 1935 |
| 2,260,636 | Neff | Oct. 28, 1941 |